United States Patent [19]

Measor et al.

[11] Patent Number: 5,699,386
[45] Date of Patent: Dec. 16, 1997

[54] SYSTEM AND METHOD FOR DATA SIGNAL COMMUNICATION USING A HIGH-PASS FUNCTION BEFORE A LOW-PASS FUNCTION WITH QUANTIZED FEEDBACK TECHNIQUE

[75] Inventors: Grahame Measor, Aptos, Calif.; Craig Taylor, Shaw, United Kingdom

[73] Assignee: GEC Plessey Semiconductors, Inc., Scotts Valley, Calif.

[21] Appl. No.: 594,414

[22] Filed: Jan. 31, 1996

Related U.S. Application Data

[63] Continuation of Ser. No. 230,022, Apr. 19, 1994, abandoned.

[51] Int. Cl.$^6$ .................... H04B 1/10; H04L 25/34
[52] U.S. Cl. .................... 375/350; 375/286; 364/724.01; 455/367
[58] Field of Search ................... 375/287, 293, 375/294, 350, 317, 318, 319, 324, 340, 346, 373, 243, 245, 252, 371, 276, 286; 364/724.01; 455/307

[56] References Cited

U.S. PATENT DOCUMENTS

| | | | |
|---|---|---|---|
| 4,339,727 | 7/1982 | Kage et al. | 327/63 |
| 4,646,153 | 2/1987 | Fukuda et al. | 348/619 |
| 4,808,939 | 2/1989 | Kingston . | |
| 5,208,837 | 5/1993 | Richey | 375/350 |
| 5,408,262 | 4/1995 | Kim et al. | 348/21 |
| 5,483,552 | 1/1996 | Shimazaki et al. | 375/233 |

OTHER PUBLICATIONS

Stallings, Data and Computer Communcations, 1994, pp. 843 & 67 through 71.
"DP83223 Twister Twisted Pair FDDI Transceiver Device," National Semiconductor Corportation, 1993.
"ML6671 TP-PMD MLT-3 Transceiver," Micro Linear, Mar. 1993.
"Quantized Feedback in an Experimental 280–Mb/s Digital Repeater for Coaxial Transmission," *IEEE Transactions on Communications*, vol. Com–22, No. 1, Jan. 1974, pp. 1–5.
"FDDI–Final There's Money to be Made", Business Cam. Buw, Aug 90, Maston Palka.

*Primary Examiner*—Wellington Chin
*Assistant Examiner*—William Luther
*Attorney, Agent, or Firm*—Fenwick & West LLP

[57] ABSTRACT

A data communication system receives data signals transmitted via a signal path and applies to the received signal a high-pass function including a low-pass filter and a summing circuit. The signal is low-pass filtered, and the summing circuit subtracts the filtered signal from the received signal to generate a high-pass signal, which is summed with a quantized-feedback signal to generate a recovered data signal. The quantized-feedback signal is provided by applying to the recovered data signal a low-pass function having a transfer function which is substantially complementary to the transfer function of the high-pass function. The low-pass function low-pass filters the recovered data signal to generate the quantized-feedback signal.

13 Claims, 2 Drawing Sheets

SYSTEM AND METHOD FOR DATA SIGNAL COMMUNICATION USING A HIGH-PASS FUNCTION BEFORE A LOW-PASS FUNCTION WITH QUANTIZED FEEDBACK TECHNIQUE

RELATED APPLICATIONS

This is a continuation of application Ser. No. 08/230,022 filed on Apr. 19, 1994 now abandoned.

BACKGROUND OF THE INVENTION

1. Field of the Invention

The invention relates generally to electronic circuits for signal communication, particularly to transceiver circuits which use quantized feedback techniques.

2. Description of Background Art

In the area of electronic signal communication and networking, various systems and circuits for data transmission and reception, as well as certain communication protocol, are well known. Communications equipment are available, for example, for transmitting and receiving serially digital data streams at 10 megabits per second using the so-called 10BaseT protocol, or 100 Mb/s using the 100BaseT protocol. Conventionally, such data signals are sent over standard transmission lines, such as twisted pair, coaxial cable, optical fiber, etc.

When implementing digital transmission systems, a number of design considerations preclude direct data transmission through the signal path between transmitter and receiver. For example, separation circuitry (e.g., isolation transformers) are sometimes appropriate for coupling between different signal power zones. Additionally, such separation circuitry may serve to decouple against potentially-damaging power surges caused by lightning, maintenance activities, or other signal interference.

Although conventional separation circuitry provide effective decoupling of interference signals at low-frequencies (i.e., at DC levels) along the transmission path, certain data signal components at such DC levels may be lost from time to time. Accordingly, it would be desirable to provide a signal communication technique which provides adequate isolation against interfering signals, without causing substantial loss of low-frequency signal components.

SUMMARY OF THE INVENTION

The invention resides in a data communication system having a transmitter and a receiver coupled via a signal path, wherein a transmitted data signal is received from its signal path, and a high-pass function is applied to the received signal to generate a high-pass signal, which is attenuated to have little low-frequency energy. The high-pass function is realized by a low-pass filter and a summing circuit, such that the low-pass filter filters the received signal to generate a filtered signal, and the summing circuit subtracts the filtered signal from the received signal to generate the high-pass signal.

Also, to generate a recovered data signal, the high-pass signal is then summed with a quantized-feedback signal, which is provided by applying to the recovered data signal a low-pass function having a transfer function which is substantially complementary to the transfer function of the high-pass function. The low-pass function includes a low-pass filter for filtering the recovered data signal to generate the quantized-feedback signal. The recovered data signal is generated by applying a slicing function to a summed signal generated from summing the high-pass signal with the quantized-feedback signal.

Preferably, the slicing function includes differential comparators, and the summed signal includes a multi-level signal, such that the differential comparators may generate differential signals from the multi-level signal, thereby minimizing signal skew. Also, preferably in the transmitting facility, a supply signal may be monitored, such that when a specified supply signal condition is detected therein, transmission of the data signal through the signal path is disabled. The specified supply signal condition may occur when a voltage of the supply signal falls below a minimum power supply voltage.

DETAILED DESCRIPTION OF THE PREFERRED EMBODIMENTS

Figure 1:
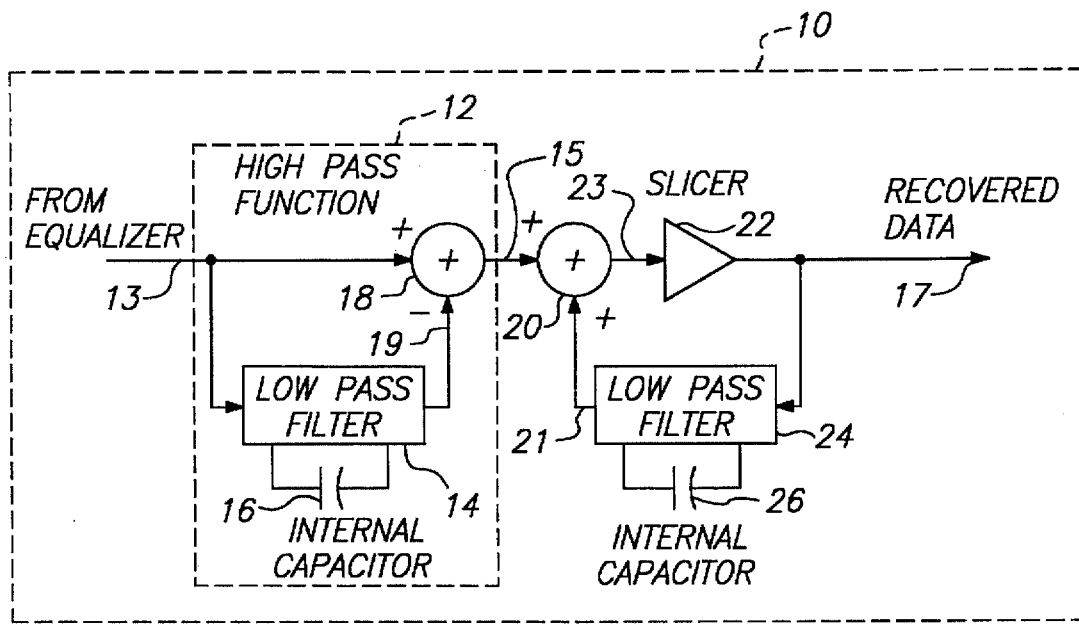
FIG. 1 is a generalized block diagram of a communication circuit illustrating significant aspects of the present invention.

In FIG. 1, a schematic block diagram shows system or circuit 10 used for communication and processing of digital data signals. In accordance with the present invention, circuit 10 is an electronic facility for receiving data signals transmitted as a digital bit stream through one or more electrical signal paths, such as twisted pair, optical fiber or coaxial cable, coupled thereto. For example, as shown, circuit 10 receives data signal 13, which preferably is a digital bit stream transmitted at a rate of 100 to 155 megabits per second (Mb/s), through a signal path, conventionally passing through an equalizer circuit or other separation circuitry (not shown).

Received data signal 13 is applied to selective attenuator or high-pass function or filter 12 to generate attenuated or high-pass signal 15. Then, high-pass signal 15 is summed or combined 20 with quantized-feedback signal 21 to generate recovered data signal 17. Quantized-feedback signal 21 is provided by applying a low-pass function or filter to recovered data signal 17, wherein such low-pass function includes a transfer function (e.g., X) which is substantially complementary to a transfer function (e.g., 1-X) of high-pass function 12.

Preferably, high-pass function 12 provides effective signal filtering for attenuating signal 13 substantially one decade from a reference value or worst-case signal level. Optionally, high-pass function 12 may cause an attenuation of received signal 13 by substantially twenty decibels from such reference value.

Preferably, high-pass function 12 causes attenuation of received signal 12 at signal frequencies substantially below one megahertz. Additionally, high-pass function 12 may cause an attenuation of received signal 13 substantially according to a specified transfer function of a separation circuit coupled to the signal path through which signal 13 is transmitted.

High-pass function 12 preferably includes low-pass filter 14 and signal summing circuit 18. Low-pass filter 14 serves to filter received signal 13 to generate low-pass filtered signal 19. In this arrangement, summing circuit 18 subtracts low-pass filtered signal 19 from received signal 13 to generate intermediate attenuated or high-pass signal 15. Preferably, low-pass filter 14 includes internal capacitor 16 coupled thereto, as shown, to account for parasitic capacitance in low-pass filter 14.

Then, intermediate attenuated signal 15 is received by other signal summing circuit 20, such that low-pass function having other low-pass filter 24 effectively filters recovered data signal 17 to generate quantized-feedback signal 21, which is then summed or combined 20 with intermediate attenuated signal 15. Preferably, low-pass filter 24 is coupled to other internal capacitor 26 to account for parasitic capacitance in low-pass filter 24.

Additionally, recovered data signal 17 may be generated by applying slicing function 22 to summed signal 23 generated from summing 20 intermediate attenuated signal 15 with quantized-feedback signal 21.

Figure 2:
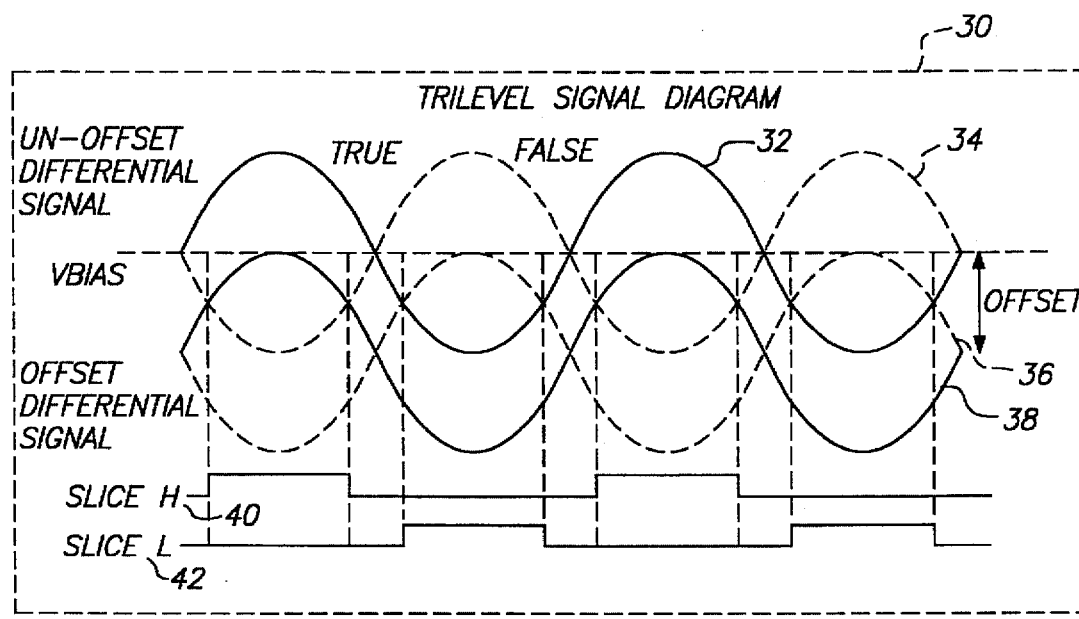
FIG. 2 is a timing diagram of representative signals employed according to the present invention.

Preferably, slicing function 22 includes differential comparators each having switchable gain values, wherein summed signal 23 is a multi-level signal, such that the differential comparators may generate differential signals from multi-level signal 23, thereby minimizing signal skew therefrom. FIG. 2 shows a representative multi-level signal, having various levels 32, 34, 36, 38, including corresponding "sliced" high and low signal levels 40, 42.

Slicer function 22 may contain three differential voltage comparators, with two being used during MLT-3 mode and there other used during NRZ mode. Comparator outputs go to logic where selection may be made. In MLT-3 mode, slice-high comparator compares TRUE part of offset signal with FALSE part of un-offset signal, and "1" is output when TRUE signal is higher than FALSE. Also, slice-low comparator compares FALSE part of offset signal with TRUE part of un-offset signal, and "1" is output when FALSE signal is higher than TRUE.

Optionally, a supply signal is monitored, such that when a specified supply signal condition is detected, transmission or reception of data signal 13 through the signal path is disabled. For example, the specified supply signal condition may occur when a voltage of the supply signal falls below a minimum power supply voltage.

Figure 3:
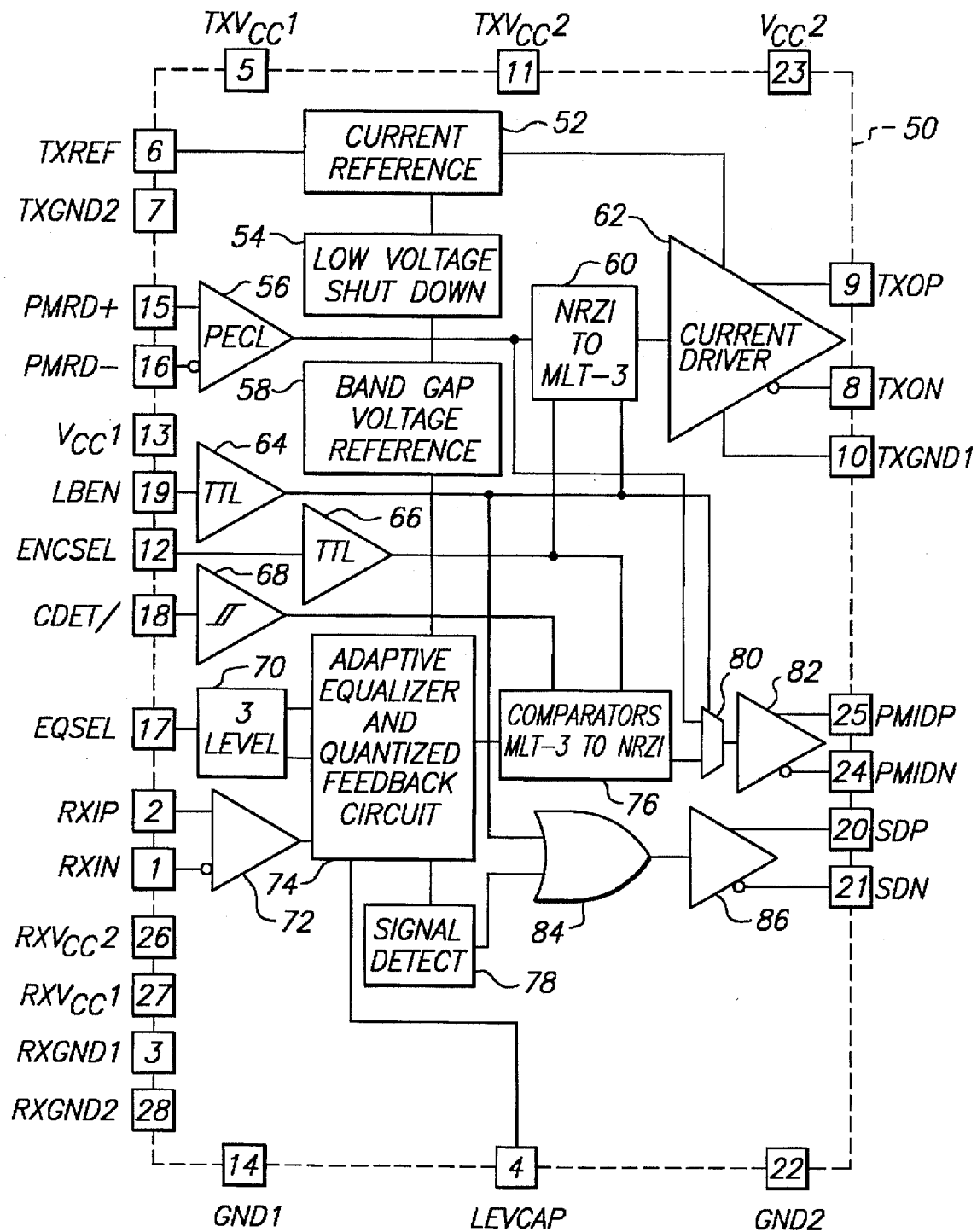
FIG. 3 is a simplified schematic block diagram of a preferred embodiment of the present invention.

In FIG. 3, a more detailed schematic block diagram shows one circuit or embodiment 50 for enabling the present invention. Circuit 50 is implemented in a single-substrate semiconductor device, such an application-specific integrated circuit (ASIC), preferably including signal transmit and receive facilities.

As implemented, the signal transmit facility of circuit 50 includes data input circuit (PECL) 56 for interfacing differential data signal PMRD± to selectable encoder (NRZ1 to MLT-3) 60, which couples to current driver 62. Encoder 60 is included in a differential logic matrix, such that when select signal (ENCSEL), passing through TTL buffer 66, is low, then encoder 60 converts the processed signal from non-return to zero mode (i.e., NRZ1) to tri level mode (i.e., MLT-3) to be generated as complementary output at signal pins TX0P/N. Further, if such select signal is high, then encoder does not change input data, and an NRZ1 signal is generated as output at TX0± signal pins.

Additionally, current driver 62 provides for current set-up through resistor (not shown) connected to pin TXREF through current reference 52 for determining current level switched by data at TX0± signal pins. This circuit configuration, enables achievement of accurate output current levels.

The line driver circuitry may include two differential amplifiers with open collector connected together. Each amplifier is fed from a constant current source that is accurately set-up preferably to be twenty milliamps (or 10 mA for NRZ1 mode). In this way, the amplifier transistors steer the current to certain ± output pins, such that the output is able to be at one of various levels (e.g., 0 current, 20 mA or 40 mA). This approach enables three output states used under MLT-3 convention. For NRZ1 mode, current sources are set to 10 mA and both amplifiers switch together.

Preferably, rise and fall times of output at signal pins TX0± is limited to two nanoseconds± 10% according to internal circuitry for eliminating need for much external filtering. Current output may be disabled by low-voltage shut-down circuit 54 coupled to bandgap voltage reference 58, which preferably is a conventional 1.3-volt voltage reference, when power supply voltage (i.e., VCC) drops below a specified value, such as 3 volts.

Preferably, a power supply monitor subcircuit is provided on-chip that monitors the state of the power supply on the VCC pins against the bandgap voltage reference 58, such that when the voltage falls below the specified minimum, the line driver is automatically turned off. In this way, a local area network associated therewith is prevented from being subjected to garbled signals when a node is in the process of being powered up or down.

The signal receive facility of circuit 50 includes various functions, provided as pre-amp and adaptive equalizer and quantized feedback circuit 74, signal detector 78, comparators MLT-3 to NRZ1 decoder 76 and loopback logic.

Preferably, adaptive equalizer and quantized feedback circuit 74 includes a differential input stage for driving an automatic line built out (ALBO) circuit, followed by a line equalizer which is set to compensate for maximum cable length. Full automatic equalization mode is selectable using the EQSEL signal pin coupled to tri-level circuit or block 70, which provides a differential offset version of input signal and measures input signal level. Hence, when EQSEL signal is allowed to float, then the ALBO function is placed in a feedback loop which may be controlled by measuring received signal level. In full equalization mode, such ALBO function prevents over-equalization of the signal when short cable lengths are used.

Trilevel block 70 preferably includes offset circuitry for providing to voltage comparators signals for data extraction. For example, to extract data from a three-level signal, two DC threshold levels are generated or sliced at midpoints between center and peaks of subject signal, positively and negatively. Two comparators may then be used to detect positive "1" or negative "1"; when neither the positive or negative comparators does not detect "1", then "0" is generated.

Another example for data extraction is by using fully differential signals to the comparators. When NRZ data is being detected, positive and inverted differential signals go to each input of the comparator, and "1" is detected when positive signal is higher in voltage to the negative signal.

Additionally, when detecting trilevel signals, such as MLT-3, two differential signals, as shown in FIG. 2, are produced, with one offset by a DC voltage from the other. The offset amount is generated by producing additional DC current into the pull-up load resistors of its differential amplifier. Such current is set by voltage stored on external capacitor, e.g., according to LEVCAP signal, such that current increases until peak voltage of offset signal reaches average voltage of un-offset signal. Thus, data are quantized and used to produce regenerated version of signal.

Additionally, level detector circuit may be provided for comparing peak level of offset signal to average level of un-offset signal, such as bias voltage, $V_{bias}$. In this way, when voltage of lowest peak exceeds $V_{bias}$, current is pulled out of LEVCAP capacitor, which in turn increases offset current, and, hence, amount of offset. Offset current may continue to pulse current out of LEVCAP until offset is sufficient to prevent peaks from crossing $V_{bias}$.

LEVCAP voltage level may also be used for setting level of signal output from trilevel driver function. Also, when DC offset is generated in quantized feedback loop in a positive direction, "TRUE" signal both for offset and un-offset versions may have higher DC level; hence, peaks will be higher than those of "FALSE" signals. Such detection occurs by comparing recent signals peaks, and comparator current is switched to side with lowest peak.

Without this feature, signal amount added to incoming signal in quantized feedback circuit is derived from low-frequency components of regenerated data signal, plus any DC offset that gets into the loop. If DC amount in loop is larger than subject signal, which is likely during quiet times when transmitter sends data to node not powered up, regenerated signal may have constant "1" on its output, which remains and may increase in amplitude. Then when transmitter starts up, signal may be too small to overcome DC offset, and hence data may not be recovered. Using comparator switch-over mechanism, lockup should not occur.

Moreover, the equalizer function can be forced into a mode that compensates for maximum cable length under various input levels, when EQSEL signal is set low. In this way, over-equalization may cause overshoot of data transitions that is clipped if the signal is a two-level NRZ1 code, but would cause errors in MLT-3 code. By setting EQSEL signal high, total equalization function may be bypassed.

Preferably, the line equalizer circuit includes two differential amplifiers arranged in parallel, with one having a flat AC response with a constant loss of 14 dB, and the other having up to 14 dB boost peaking at 80 megahertz. The amount of boost is controlled by DC current being forced through emitter diodes of the amplifier transistors, and thus changes the effective emitter resistance.

As described above, internal capacitors 16, 26 may be included in the line equalizer circuit to shape the frequency response of the boost and balance parasitic capacitance to substrate and compensate for distortion caused by any diodes therein. One arrangement is configured such that when current flows through RC impedance, any change in resistive characteristic of emitter follower due to change in its current is canceled by the opposite change in the current flowing in other diode. Because AC impedance of such diodes is in parallel, the total impedance is constant, at least to a first order for low-level signals.

The current may be controlled by an automatic gain control (AGC) type loop from a signal from the AGC circuit. The frequency shaping of the equalizer may be set such that loss of cable plus boost of the equalizer results in a gaussian response having half neaper (~4.5 dB) point at 80 megahertz, i.e., the nyquist frequency of a 160 Mb/s digital signal.

Such AGC circuit compares signal peaks of the level coming out of switched gain block against a preset DC level derived from the bandgap voltage. By using switched gain block in equalizer control loop, changing between MLT-3 and NRZ codes is enabled without external component changes.

Additionally, if the amount of cable is short and equalization is relatively high, then overshoot may occur on the signal coming from the equalizer. This excess peak level may be detected and a signal fed back to the equalizer to reduce equalizer current until the correct level is achieved. This negative feedback loop is damped and stabilized by internal Miller capacitance.

The MLT-3 and NRZ1 codes, which have significant low frequency components in their spectrum, are not transmitted through separation circuitry or transformers that couple signal path to the subject system or board. This approach results in so-called "base line wander" which can significantly reduce receive noise immunity.

Using quantized feedback approach, the removed low-frequency signal components may be restored, particularly by using feedback circuitry that passes the recovered data through a filter that has a complementary transfer function to the high pass function of the line transformers coupled to the signal path.

In order to reinsert the low-frequency components that were removed by the high-pass transfer function of the signal path or media, the shape of the high-pass function preferably is known. But if it is uncertain what the high-pass characteristics of the transformers used in the line interface are, a dominant high-pass function may be inserted, as described herein.

Further, a low-pass filter that has the complimentary transfer function (i.e., 1-HPF) is used on the recovered data and fed back and added to the subject data signal. This approach removes base line wander as well as DC offset that may exist on the received signal. The level of the feedback signal is determined by measuring the peak level of the signal at the combiner/summing amplifier output.

Preferably, a quantized feedback block is provided in circuit 74, such that subject signal 13 comes into block 10 and goes to low-frequency filter/amplifier (LFAMP) and high-frequency filter/amplifier (HFAMP). The signal out of LFAMP contains low-frequency components of the input signal and are subtracted from the original input signal by HFAMP. A second LFAMP contains low-frequency components of the regenerated (i.e., quantized) input signal, such that these components are added back in to replace those components removed by the first LFAMP.

LFAMP may include a standard differential amplifier with a gain of 0 dB between the input and outputs. One additional feature of this circuit initially has a 6 dB gain to allow Miller multiplication of capacitors that give the amplifier its low-pass response. In this way, the signal is padded down, effectively by a resistor divider, before the output buffers to bring the gain back to 0 dB. LFAMP preferably provides first-order, low-pass filter function having cutoff frequency of approximately one megahertz.

HFAMP may include three differential amplifiers having their collectors connected together. The collector load is then cascoded to improve high-frequency response, by isolating collector capacitance from pull-up resistor loads. The first two amplifiers obtain input signals from LFAMPs, and third amplifier gets its input from signal input from equalizer block. HFAMP may turn off the amplifiers that are connected to LFAMPs, thereby providing ability to disable quantized feedback function.

Hence, the reconstituted signal has all frequency components of originally transmitted signal, regardless of frequency response of transformers in the media path, assuming the high-pass cutoff frequency is lower than one megahertz. To accomplish good signal reconstitution, both LFAMPs have the same or substantially similar characteristics, and the regenerated signal is of the same amplitude as the original signal.

Optionally, a DC lockup function is provided such that a constant DC voltage is maintained around a feedback loop and increased when the loop gain exceeds one. In this way, if a level is present around the loop, it will make the DC peak level look larger. But if the DC level builds up until the slicing function no longer detects the signal, the system may be "locked up."

Thus, to prevent DC lockup, the DC level is measured from the more negative of the signal and its compliment's peak. An increase in DC offset will result in reduction in level and, hence, in feedback signal amplitude. In this way, negative feedback of DC is provided within the bandwidth of provided internal capacitor circuitry, but positive quantized feedback at higher frequencies.

Signal detector 78 coupled to circuit 74 is provided, such that when the received signal level is below a minimum or invalid, then a signal-detect signal indicates such status, using ouput signal pins SD± coupled to gate 84 and buffer 86. When circuit 50 is in loopback mode, SD signal is disabled. Preferably, signal detect is asserted within one millisecond of data loss occurrence.

Further, comparators MLT-3 to NRZ1 decoder circuit 76 is provided such that when MLT-3 mode is selected, with ENCSEL select signal preferably being high, a window comparator is used to determine when the subject signal is low, zero or high. In this way, the comparator outputs may be OR'd together to reproduce NRZ1 data. Also, when logic "1" level is put on the loopback pin, data input on the transmit facility (i.e., PMRD±) is directed to PMID± outputs, and TXO± outputs are disabled. Under the loopback condition, SD± may be forced to TRUE state.

We claim:

1. A signal processing method comprising the steps of:
   receiving a data signal transmitted through a signal path;
   applying to the received signal a high-pass function to generate a high-pass signal, the high-pass function having a transfer function and comprising a first low-pass filter and a first summing circuit, the first low-pass filter including a first internal capacitor to account for a parasitic capacitance in the first low-pass filter, the first low-pass filter filtering the received signal to generate a first filtered signal, the first summing circuit subtracting the first filtered signal from the received signal to generate the high-pass signal;
   summing the high-pass signal and a quantized-feedback signal to generate a multilevel signal, the quantized-feedback signal being provided by applying a low-pass function to a recovered data signal, the low-pass function having a transfer function which is complementary to the transfer function of the high-pass function; and
   slicing the multi-level level signal through a slicer having a slicer function to generate the recovered data signal, the slicer function having at a plurality of differential comparators for extracting the recovered data signal from the multi-level signal.

2. The method of claim 1 wherein:
   the data signal comprises a digital bit stream transmitted at a rate of at least 100 megabits per second, and the signal path comprises a twisted-pair cable.

3. The method of claim 1 wherein:
   the high-pass function causes an attenuation of the received signal by substantially one decade from a specified level.

4. The method of claim 1 wherein:
   the high-pass function causes an attenuation of the received signal by substantially 20 decibels from a specified level.

5. The method of claim 1 wherein:
   the high-pass function causes an attenuation of the received signal at signal frequencies below one megahertz.

6. The method of claim 1 wherein:
   the low-pass function comprises a second low-pass filter for filtering the recovered data signal to generate the quantized-feedback signal.

7. The method of claim 6 wherein:
   the second low-pass filter couples to a second internal capacitor to account for a parasitic capacitance in the second low-pass filter.

8. The method of claim 1 wherein:
   the slicing function comprises the plurality of differential comparators, each differential comparator having an alternating current (AC) source with a direct current (DC) offset, the plurality of differential comparators generating a plurality of differential signals from the multi-level signal, for minimizing signal skew from the multi-level signal.

9. The method of claim 8 wherein:
   the DC offset of each differential comparator is switchable.

10. In a data communication system having a transmitter and a receiver coupled via a signal path, a signal processing method comprising the steps of:
    receiving by a receiver a data signal transmitted by a transmitter through the signal path;
    applying to the received signal a high-pass function to generate a high-pass signal, the high-pass function comprising a first low-pass filter and a first summing circuit, the first low-pass filter filtering the received signal to generate a first filtered signal, the first summing circuit subtracting the first filtered signal from the received signal to generate the high-pass signal, the first low-pass filter comprising a first internal capacitor coupled thereto to account for a parasitic capacitance in the first low-pass filter; and
    summing the high-pass signal and a quantized-feedback signal to generate a recovered data signal, the quantized-feedback signal being provided by applying a low-pass function to the recovered data signal, the low-pass function having a transfer function which is substantially complementary to a transfer function of the high-pass function, the low-pass function comprising a second low-pass filter for filtering the recovered data signal to generate the quantized-feedback signal, the second low-pass filter comprising a second internal capacitor coupled thereto to account for a parasitic capacitance in the second low-pass filter, the recovered data signal being generated by applying a slicing function to a second summed signal generated from summing the high-pass signal with the quantized-feedback signal, the slicing function comprising a plurality of differential comparators, the second summed signal comprising a multi-level signal, such that the differential comparators generate a plurality of differential signals from the multi-level signal, thereby minimizing signal skew therefrom, a gain of at least one differential comparator being switchable.

11. The method of claim 10 further comprising the step of:
    monitoring a supply signal, such that when a specified condition of the supply signal is detected, transmission of the data signal through the signal path is disabled, the specified supply signal condition occurring when a voltage of the supply signal falls below a minimum power supply voltage.

12. A data communication system comprising a transmitter and a receiver coupled via a signal path;

wherein the receiver receives a data signal transmitted by the transmitter through the signal path, a high-pass function being applied to the received signal to generate a high-pass signal, the high-pass function comprising a first low-pass filter and a first summing circuit, the first low-pass filter filtering the received signal to generate a first filtered signal, the first summing circuit subtracting the first filtered signal from the received signal to generate the high-pass signal, the high-pass signal and a quantized-feedback signal being summed to generate a recovered data signal, the quantized-feedback signal being provided by applying a low-pass function to the recovered data signal, the low-pass function having a transfer function which is complementary to a transfer function of the high-pass function, the low-pass function comprising a second low-pass filter for filtering the recovered data signal to generate the quantized-feedback signal, the recovered data signal being generated by applying a slicing function to a second summed signal generated from summing the high-pass signal with the quantized-feedback signal.

13. The system of claim 12 wherein:

the slicing function comprises a differential comparator, the second summed signal comprising a multi-level signal, such that the differential comparator generates differential signals from the multi-level signal, thereby minimizing signal skew from the multi-level signal.

\* \* \* \* \*